United States Patent
Ye et al.

(10) Patent No.: US 9,222,245 B2
(45) Date of Patent: Dec. 29, 2015

(54) QUICK ASSEMBLY AND DISASSEMBLY MECHANISM

(71) Applicant: XIAMEN LOTA INTERNATIONAL CO., LTD., Xiamen (CN)

(72) Inventors: Liming Ye, Xiamen (CN); Shuanglin Bai, Xiamen (CN); Jianping Zhou, Xiamen (CN)

(73) Assignee: XIAMEN LOTA INTERNATIONAL CO., LTD., Xiamen, Fujian (CN)

( * ) Notice: Subject to any disclaimer, the term of this patent is extended or adjusted under 35 U.S.C. 154(b) by 169 days.

(21) Appl. No.: 14/065,427

(22) Filed: Oct. 29, 2013

(65) Prior Publication Data

US 2014/0124049 A1 May 8, 2014

(30) Foreign Application Priority Data

Nov. 5, 2012 (CN) .......................... 2012 1 0435537

(51) Int. Cl.
| | | |
|---|---|---|
| E03C 1/042 | (2006.01) | |
| F16B 39/36 | (2006.01) | |
| F16B 39/06 | (2006.01) | |
| E03C 1/04 | (2006.01) | |
| F16B 29/00 | (2006.01) | |

(52) U.S. Cl.
CPC ................ *E03C 1/04* (2013.01); *E03C 1/0401* (2013.01); *F16B 29/00* (2013.01); *Y10T 137/598* (2015.04)

(58) Field of Classification Search
CPC .................................. E03C 1/0401; E03C 1/04
USPC ........ 4/695, 689, 675; 137/359; 411/270, 433
See application file for complete search history.

(56) References Cited

U.S. PATENT DOCUMENTS

| | | | |
|---|---|---|---|
| 4,435,111 A * | 3/1984 | Mizusawa ...................... 411/437 |
| 7,284,857 B1 * | 10/2007 | Dahlem ......................... 351/203 |
| 8,231,318 B2 * | 7/2012 | Pitsch et al. .................... 411/270 |
| 8,863,769 B2 * | 10/2014 | Andersen et al. .............. 137/359 |
| 2002/0133875 A1 * | 9/2002 | Hecker .............................. 4/675 |
| 2002/0189674 A1 * | 12/2002 | Meeder .......................... 137/359 |
| 2004/0154096 A1 * | 8/2004 | Tsutsui et al. ..................... 4/695 |
| 2013/0220439 A1 * | 8/2013 | Pitsch et al. ............... 137/15.08 |

* cited by examiner

*Primary Examiner* — Huyen Le
*Assistant Examiner* — Christine Skubinna

(57) ABSTRACT

A quick assembly and disassembly mechanism includes a nut seat and a slide block which is movably coupled to the nut seat. The nut seat includes at least two cantilever lock blocks therein. The inner wall of each lock block has threads thereon. The inner diameter encircled by the lock blocks matches with a bolt of a faucet. In normal state, the nut seat can be moved freely on the bolt. When the nut seat is moved to a counter top to compress the slide block, the slide block will push the lock blocks to mesh with the bolt tightly, so that the faucet can be mounted and dismounted quickly.

2 Claims, 7 Drawing Sheets

QUICK ASSEMBLY AND DISASSEMBLY MECHANISM

BACKGROUND OF THE INVENTION

1. Field of the Invention

The present invention relates to a quick assembly and disassembly mechanism, and more particularly to a quick assembly and disassembly mechanism for the faucet and its parts of a bathroom sink and a kitchen sink.

2. Description of the Prior Art

When a faucet is installed at one side of a sink, a nut is used to mesh with the bolt at the lower end of the faucet so that the faucet can be installed on the counter top. The faucet of the kitchen and the bathroom is installed close to the wall. Subject to the shape of the kitchen sink and the bathroom sink, the space under the counter top to lock the faucet is very small. According to the traditional operation to lock the nut on the bolt, the nut must be rotated from the lower end of the bolt. The length of the bolt depends on the thickness of the counter top, namely, it decides the route of the nut to be locked. Thus, to lock or unlock the nut takes time and energy.

In order to install the faucet quickly, a quick assembly structure for faucets is developed on the market. This structure achieves quick installation through a one-way engagement way. However, when dismounted, the nut must be dismounted from the highest position to the distal of the bolt. It also takes time and energy. Because the space under the counter top is narrow, it is difficult to operate. The faucet cannot be dismounted quickly. Accordingly, the inventor of the present invention has devoted himself based on his many years of practical experiences to solve these problems.

SUMMARY OF THE INVENTION

The primary object of the present invention is to provide a quick assembly and disassembly mechanism for installing a faucet and its related parts quickly and conveniently.

According to a first aspect of the present invention, the quick assembly and disassembly mechanism is movably fitted on a bolt at a lower portion of a faucet. The quick assembly and disassembly mechanism comprises a nut seat and a slide block which is movably coupled to the nut seat. The nut seat has an insertion room at a central portion thereof. The upper end of the insertion room is provided with a plurality of spaced cantilever lock blocks which are disposed vertically around the circumference of the insertion room. The inner wall of each lock block has threads thereon. The inner diameter encircled by the lock blocks matches with the bolt at the lower portion of the faucet. An insertion seat is formed between the lock blocks and the insertion room. Each lock block has a connecting surface at an upper end thereof. The connecting surface has an insertion hole for the slide block to be inserted into the insertion seat. The outer wall of the lower portion of each lock block is formed with an inclined guide surface which is expanded outwardly from top to bottom. The inner wall of the middle portion of the insertion seat of the nut seat is provided with a plurality of ledges. The slide block is an insertion ring. An annular surface of the slide block is provided with a plurality of claws corresponding in number to the lock blocks. Each claw has an engaging hook on the outer wall of the lower end thereof to cooperate with the corresponding ledge. The inner wall of each claw is formed with an inclined push surface which is expanded outward from top to bottom.

Preferably, the outer wall of the nut seat is formed with spaced vertical pull portions.

According to a second aspect of the present invention, the quick assembly and disassembly mechanism is movably fitted on a bolt at a lower portion of a faucet. The quick assembly and disassembly mechanism comprises a nut seat and a slide block which is movably coupled to the nut seat. The nut seat has an insertion room at a central portion thereof. The lower end of the insertion room is provided with a plurality of spaced cantilever lock blocks which are disposed upwardly and vertically around the circumference of the insertion room. The inner wall of each lock block has threads thereon. The inner diameter encircled by the lock blocks matches with the bolt at the lower portion of the faucet; an insertion seat formed between the lock blocks and the insertion room. The outer wall of each lock block is formed with an inclined guide surface which is expanded outwardly from top to bottom. The inner wall close to the middle portion of the insertion seat of the nut seat is provided with a plurality of ledges. The slide block is an insertion ring. The slide block has engaging legs at a lower end thereof to cooperate with the ledges. The inner wall close to the upper portion of the slide block is formed with an inclined push surface which is expanded outward.

Preferably, the outer wall of the nut seat is formed with spaced vertical pull portions.

Preferably, the outer wall of the slide block is formed with recesses corresponding to the ledges, and the engaging legs are disposed at the lower ends of the recesses.

Preferably, the outer wall of the nut seat is formed with spaced vertical pull portions.

Accordingly, the present invention comprises a nut seat provided with at least two cantilever lock blocks. In normal state, the nut seat can be moved freely on the bolt. It is not necessary to rotate the nut seat from the bottom end of the bolt. The nut seat cooperates with a slide block which is movably coupled to the nut seat. When the nut seat is moved to a counter top to compress the slide block, the inclined push surface of the slide block will push the inclined guide surface of the lock blocks to mesh with the bolt tightly, so that the faucet can be mounted and dismounted quickly. The assembly and disassembly of the faucet and the related parts is more convenient and quick.

DETAILED DESCRIPTION OF THE PREFERRED EMBODIMENTS

Figure 1:
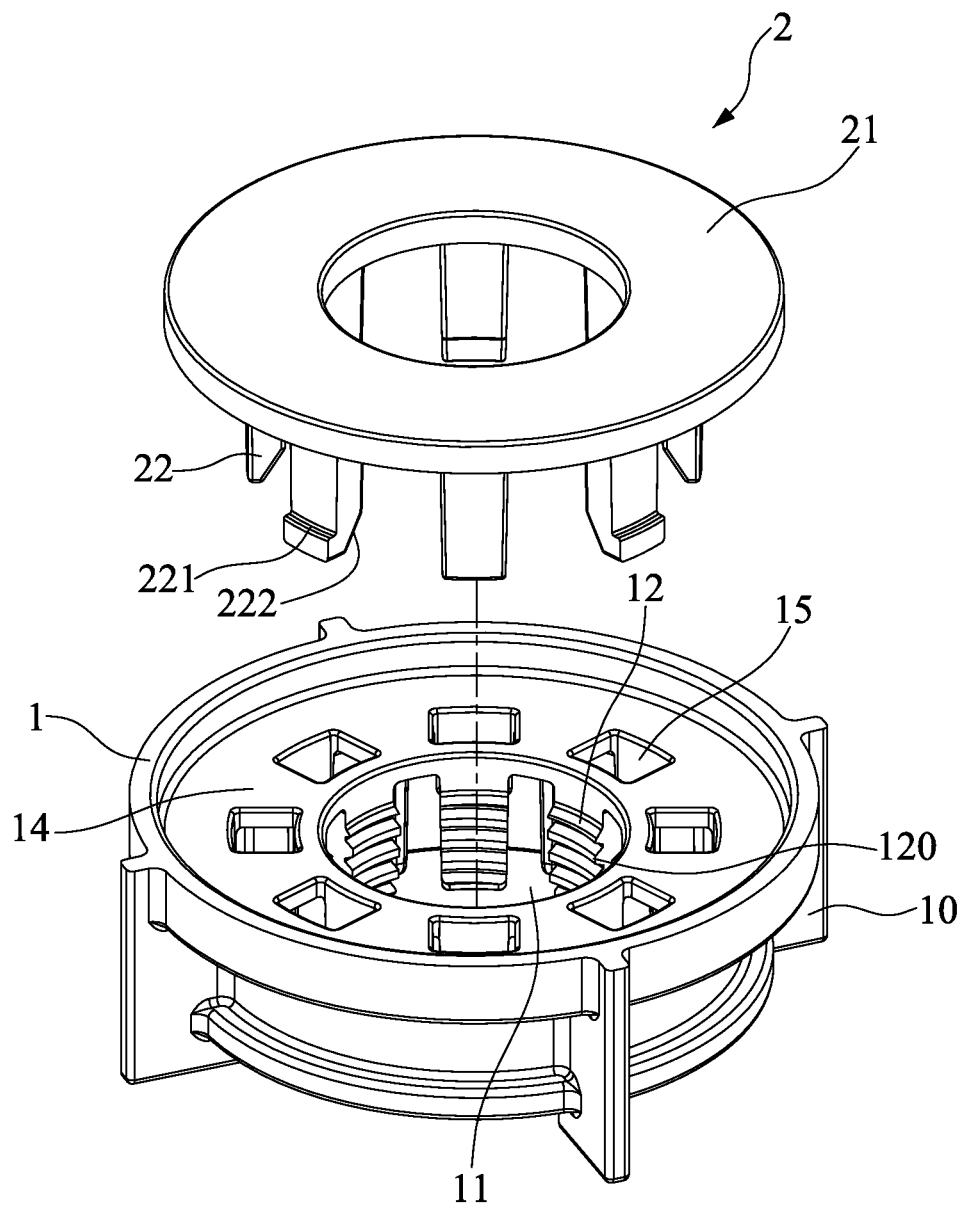
FIG. 1 is an exploded view according to a first embodiment of the present invention.

Embodiments of the present invention will now be described, by way of example only, with reference to the accompanying drawings.

As shown in FIG. 1 to FIG. 7, the present invention discloses a quick assembly and disassembly mechanism for installing the related parts of the faucet of a kitchen sink or a bathroom sink. The assembly and disassembly mechanism is movably fitted on the bolt at the lower portion of the faucet to fix the faucet on the kitchen sink or the bathroom sink or on the counter top B. The mechanism comprises a nut seat 1 and a slide block 2 which is movably coupled to the nut seat 1.

The outer wall of the nut seat 1 is formed with spaced vertical pull portions 10 for the nut seat 1 to be rotated by applying a force. The nut seat 1 has an insertion room 11 at a central portion thereof. The upper end or the lower end of the insertion room 11 is provided with at least two spaced cantilever lock blocks 12 which are disposed vertically around the circumference of the insertion room 11. The inner wall of each lock block 12 has threads 120 thereon. The inner diameter encircled by the lock blocks 12 closely matches up the bolt A at the lower end of the faucet. An insertion seat 13 is formed between the lock blocks 12 and the insertion room 11. The outer wall of each lock block 12 is formed with an inclined guide surface 121 which is expanded outwardly from top to bottom. The cantilever lock blocks 12 of the nut seat 1 have resilience, so the distal ends can be deformed when applied with a force and can return to the initial state when the force is released.

The slide block 2 is an insertion ring and movably coupled to the insertion seat 13 of the nut seat 1. The slide block 2 has inclined push surfaces corresponding to the inclined guide surfaces 121 of the lock blocks 12. When the slide block 2 is fully inserted into the insertion seat 13, the inclined push surfaces of the slide block 2 will push the lock blocks 12 to math with the bolt A of the faucet.

Figure 2:
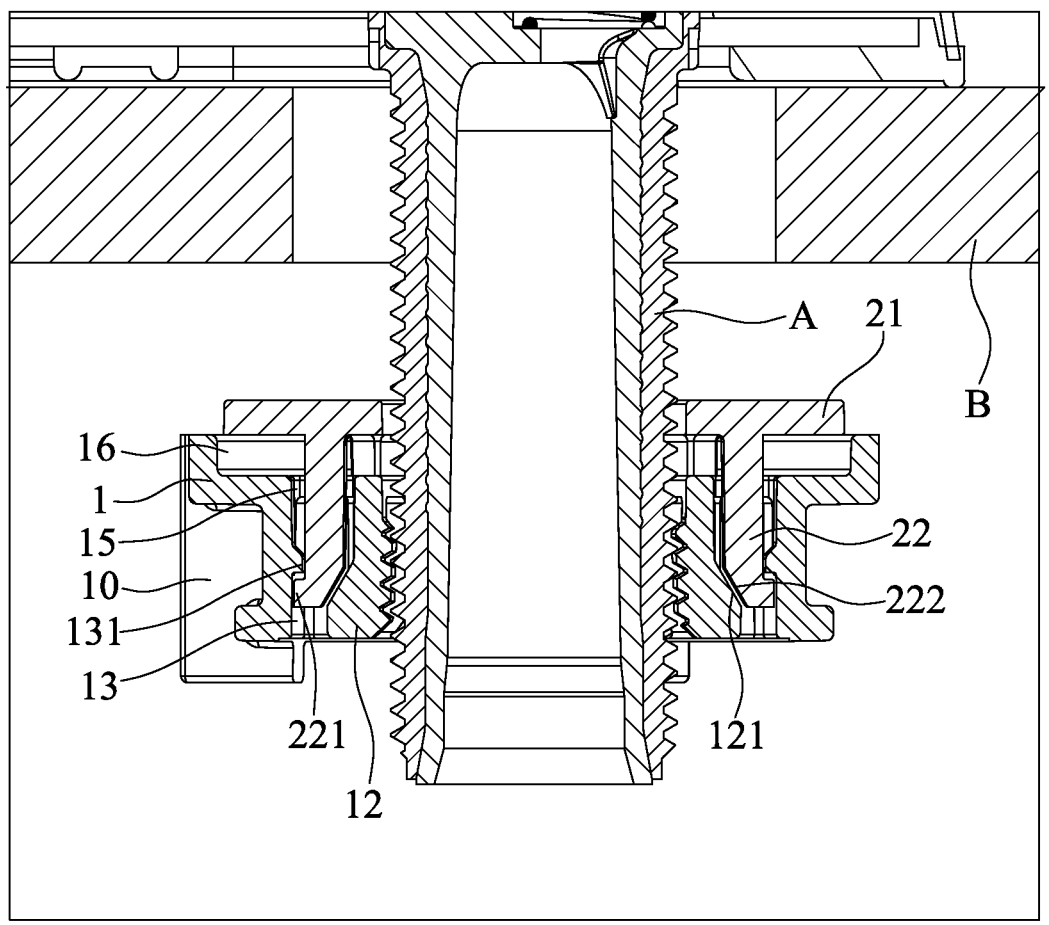
FIG. 2 is a sectional view of the first embodiment of the present invention cooperated with the faucet (when not locked)
Figure 3:
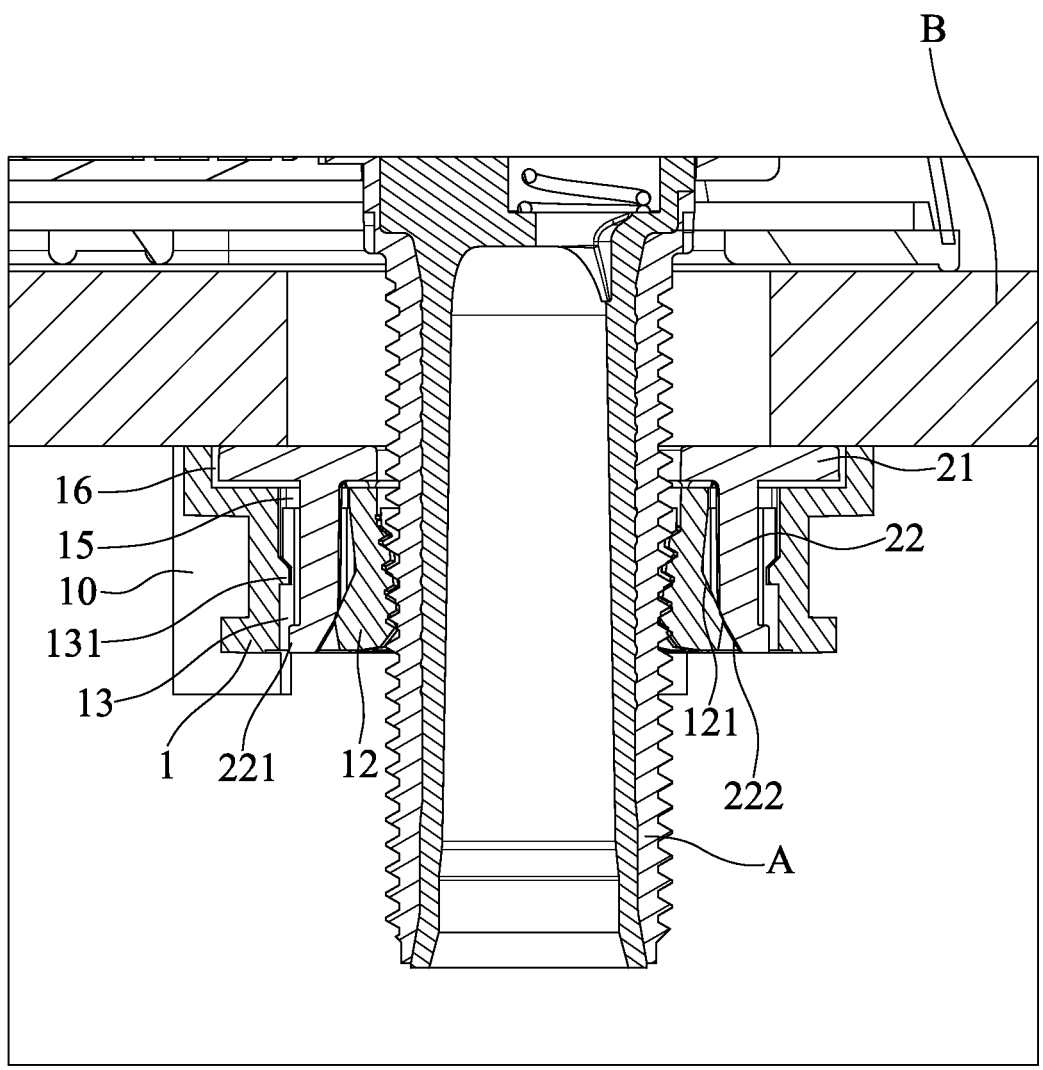
FIG. 3 is a sectional view of the first embodiment of the present invention cooperated with the faucet (when locked)

FIG. 1 to FIG. 3 shows a first embodiment of the quick assembly and disassembly the present invention. Wherein, the lower end of the insertion room 11 of the nut seat 1 is provided with a plurality spaced cantilever lock blocks 12 which are disposed vertically around the circumference of the insertion room 11 from top to bottom. Each lock block 12 has a connecting surface 14 at an upper end thereof. The connecting surface 14 has an insertion hole 15 for insertion of each claw 22 of the slide block 2 to be inserted into the insertion seat 13. The connecting surface 14 is formed with a depression seat 16 relative to the top end of the nut seat 1. The height of the depression seat 16 is slightly larger than the thickness of an annular surface 21 of the slide block 2, such that the upper surface of the slide block 2 and the top surface of the nut seat 1 are on the same plane to cooperate with the counter top B conveniently. The outer wall of the lower portion of each lock block 12 is formed with an inclined guide surface 121 which is expanded outwardly from top to bottom. The inner wall of the middle portion of the insertion seat 13 of the nut seat 1 is provided with a plurality of ledges 131 to prevent disengagement.

In this embodiment, an annular surface 21 of the slide block 2 is provided with a plurality of claws 22 corresponding to the lock blocks 12. Each claw 22 has an engaging hook 221 on the outer wall of the lower end thereof to cooperate with the corresponding ledge 131. The inner wall of each claw 22 is formed with an inclined push surface 222 which is expanded outward from top to bottom.

To assemble the present invention, the claws 22 of the slide block 2 are respectively inserted into the insertion seat 13 from the corresponding insertion holes 15 at the upper end of the nut seat 1 and moved downward for the engaging hook 221 of each claw 22 to be engaged under the corresponding ledge 131, so that the slide block 2 and the nut seat 1 are assembled together. That is to say, the engaging hooks 221 of the slide block 2 and the ledges 131 of the nut seat 1 constitute an anti-disengagement device for the related demand of transportation. By the confinement of the inclined guide surface 121 of each lock block 12, in normal state, the inclined push surface 222 of the slide block 2 is located above the inclined guide surface 121 of the lock block 12, namely, the upper end of the slide block 2 extends out of the upper end of the nut seat 1.

As shown in FIG. 2 and FIG. 3, when the present invention is used for installation of a faucet, the nut seat 1 having the slide block 2 is fitted on the bolt A from the lower end of the bolt A. Because each lock block 12 is designed to be a cantilever, the lock blocks 12 have a concession space initially and cannot be threaded to the bolt A, so that the nut seat 1 can be directly moved up to the position of the counter top B quickly. By applying an upward force to the nut seat 1, the counter top B has a downward force to the lock blocks 2 for the lock blocks 2 to be moved downward relative to the nut seat 1, in the meanwhile, the inclined push surface 222 of each claw 22 pushes the inclined guide surface 121 of each lock block 12 for each lock block 12 to be pushed toward the insertion room 11, such that the lock blocks 12 are threadedly connected with the bolt A for the faucet to be installed on the counter top B quickly. The connection of the faucet and the counter top B will be more stable and firm when the lock blocks 12 are further pushed downward to engage with tightly.

To disassemble the faucet, the nut seat 1 is rotated reversely to move downward relative to the bolt A, such that the counter top B doesn't hold against the slide block 2 and the slide block 2 doesn't push the lock blocks 12. Thus, the nut seat 1 having the slide block 2 is pulled to disengage from the bolt A quickly to achieve a quickly disassembly function.

Accordingly, the inclined push surface 222 of the slide block 2 and the inclined guide surface 121 of each lock block 12 of the nut seat 1 constitute a guide device. After the slide block 2 and the nut seat 1 are assembled, the slide block 2 is in contact with the nut seat 1. Before installation, the slide block 2 is in a free state. After installation, the action force contact with the counter top B is applied to the nut seat 1 through the slide block 2, and the guide device makes the lock blocks 12 being deformed inward to engage with the bolt A tightly. When the action force contact with the counter top B is released, the parts restore to the initial state.

Figure 4:
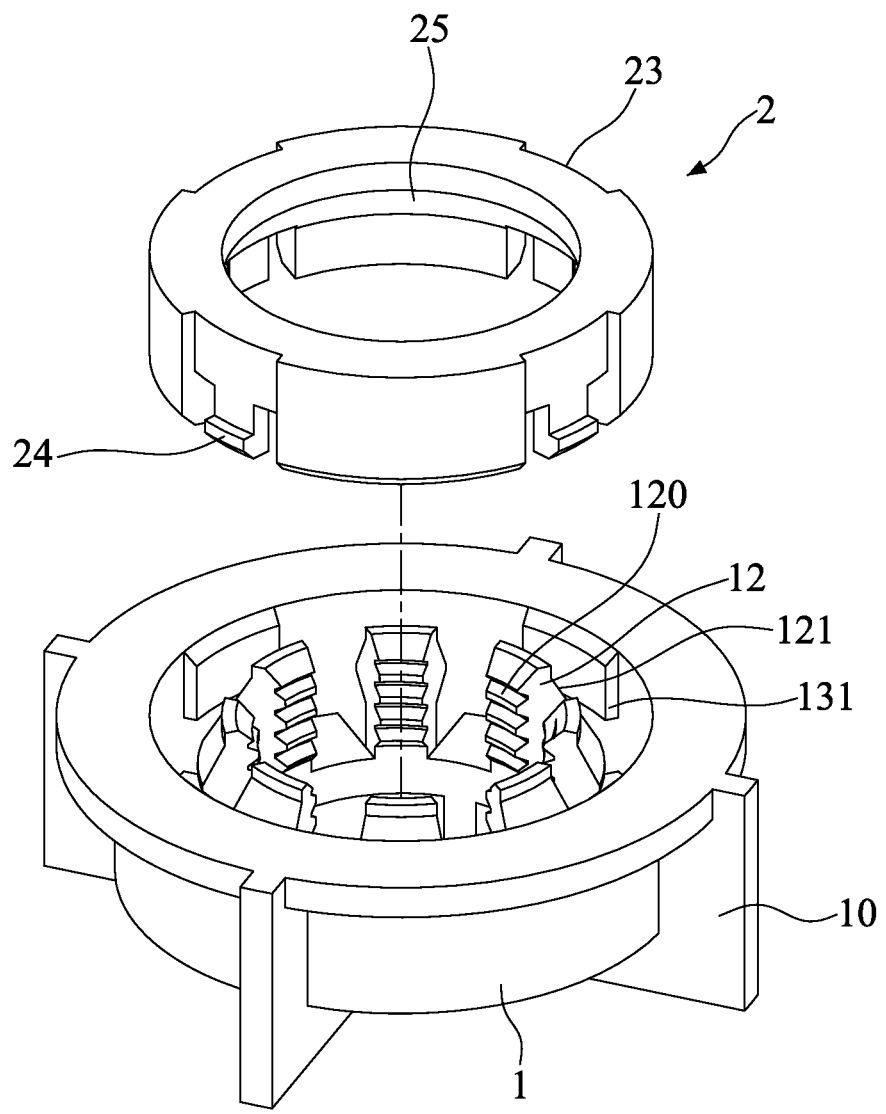
FIG. 4 is an exploded view according to a second embodiment of the present invention.
Figure 5:
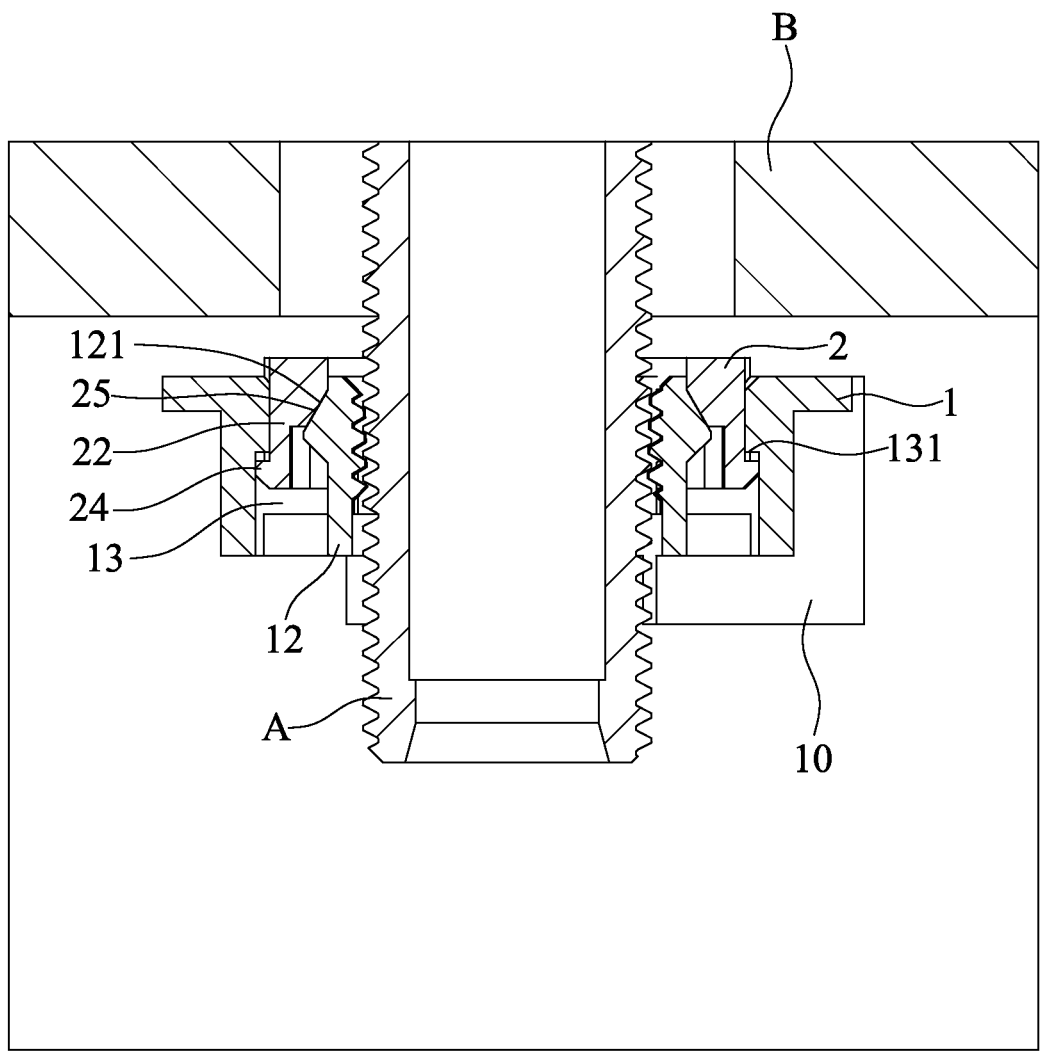
FIG. 5 is a sectional view of the second embodiment of the present invention cooperated with the faucet (when not locked)
Figure 6:
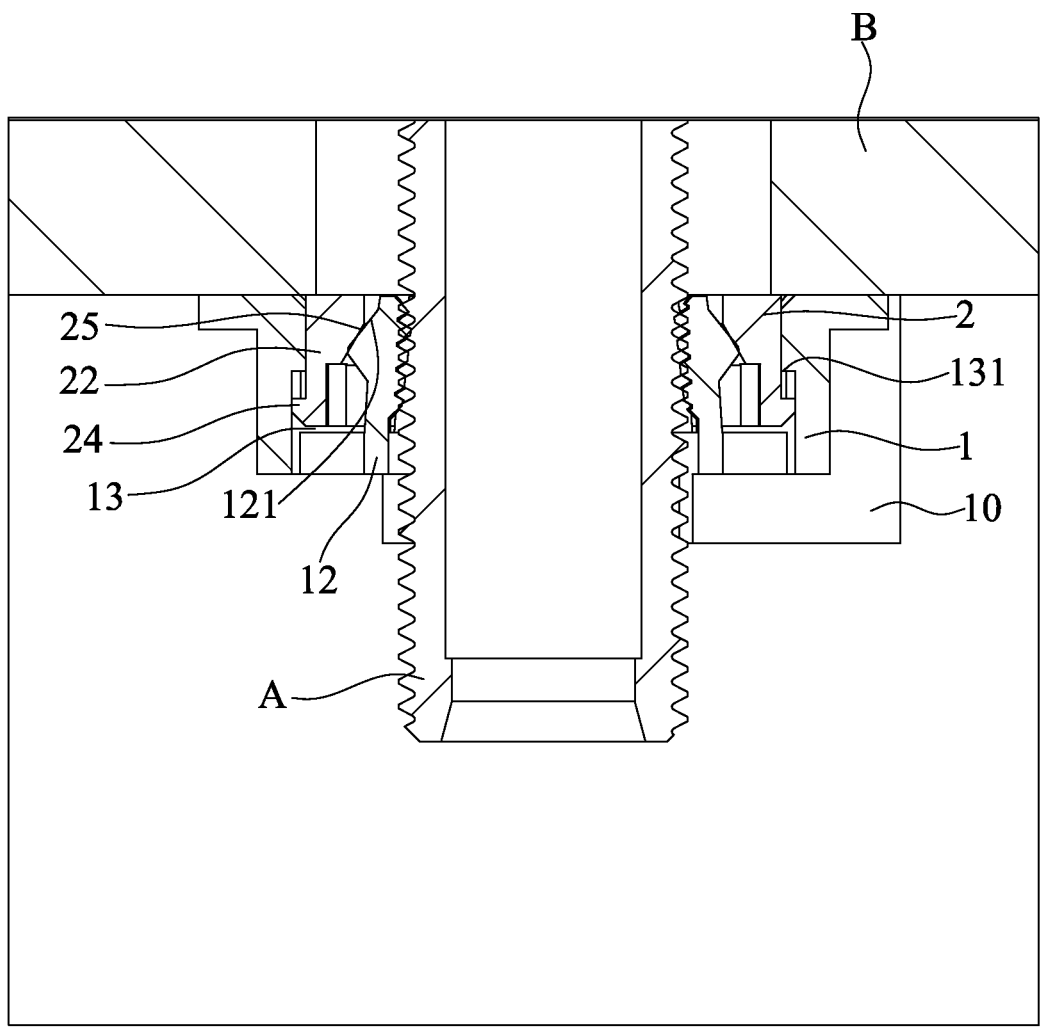
FIG. 6 is a sectional view of the second embodiment of the present invention cooperated with the faucet (when locked)
Figure 7:
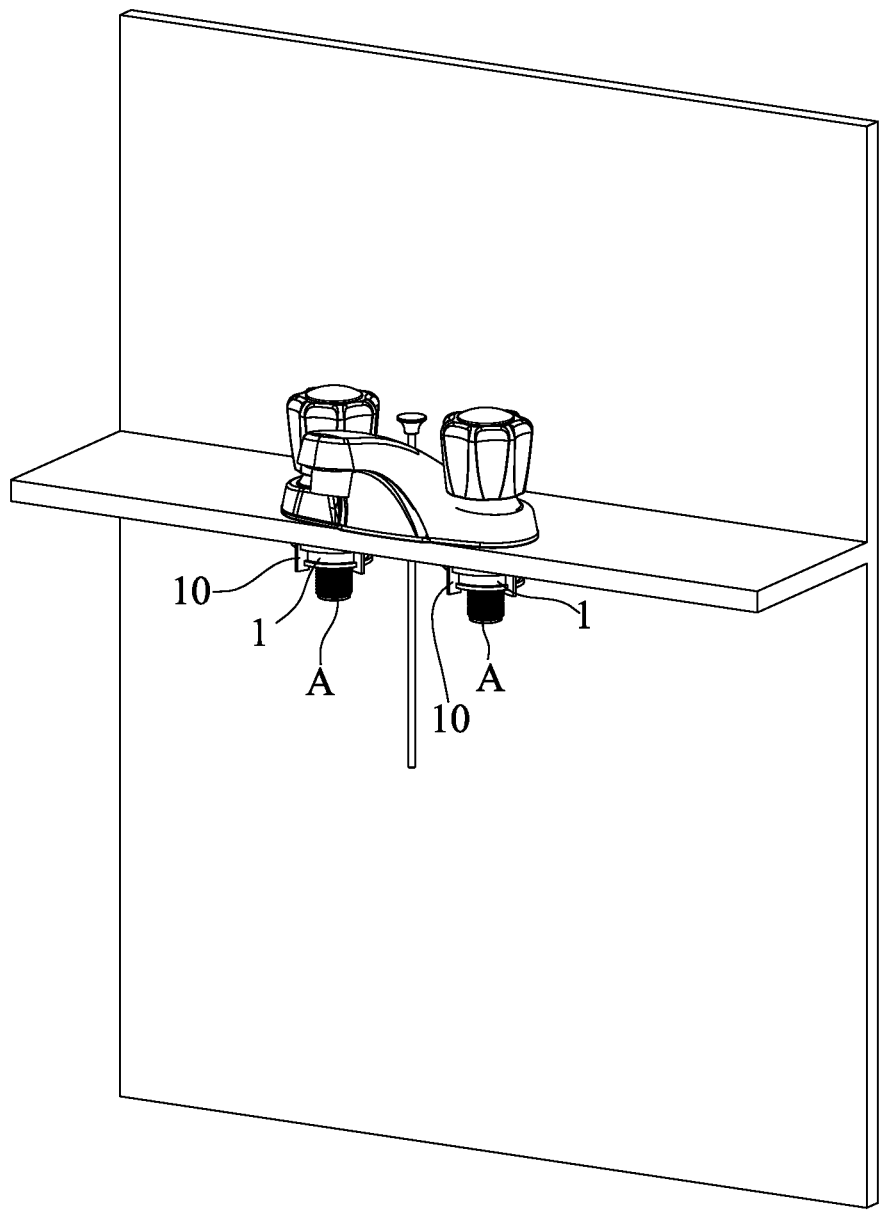
FIG. 7 is a schematic view after the faucet is installed.

FIG. 4 to FIG. 6 shows a second embodiment of the quick assembly and disassembly the present invention. Wherein, the insertion room 11 of the nut seat 1 is provided with a plurality spaced cantilever lock blocks 12 which are disposed upwardly and vertically around the circumference of the insertion room 11. The outer wall of the upper portion of each lock block 12 is formed with an inclined guide surface 121 which is expanded outwardly from top to bottom. The inner wall close to the middle portion of the insertion seat 13 of the nut seat 1 is provided with a plurality of ledges 131 to prevent disengagement.

In this embodiment, the slide block 2 is an insertion ring. The outer wall of the slide block 2 is formed with recesses 23 corresponding to the ledges 131. The slide block 2 has engaging legs 24 at the lower ends of the recesses 23 to cooperate with the ledges 131. The inner wall close to the upper portion of the slide block 2 is formed with an inclined push surface 25 which is expanded outward.

To assemble the present invention, the recesses 23 of the slide block 2 correspond in position to the ledges 131, and then the slide block 2 is inserted into the insertion seat 13 from the top end of the nut seat 1 and moved downward for the engaging legs 24 to be engaged under the ledges 131, so that the slide block 2 and the nut seat 1 are assembled together.

The engaging legs 24 of the slide block 2 and the ledges 131 of the nut seat 1 constitute an anti-disengagement device for the related demand of transportation. By the confinement of the inclined guide surface 121 of each lock block 12, in normal state, the inclined push surface 25 of the slide block 2 is located above the inclined guide surface 121 of the lock block 12, namely, the upper end of the slide block 2 extends out of the upper end of the nut seat 1.

As shown in FIG. 5 and FIG. 6, when the present invention is used for installation of a faucet, the nut seat 1 having the slide block 2 is fitted on the bolt A from the lower end of the bolt A. Because each lock block 12 is designed to be a cantilever, the lock blocks 12 have a concession space initially and cannot be threaded to the bolt A, so that the nut seat 1 can be directly moved up to the position of the counter top B quickly. By applying an upward force to the nut seat 1, the counter top B has a downward force to the lock blocks 2 for the lock blocks 2 to be moved downward relative to the nut seat 1, in the meanwhile, the inclined push surface 25 of the slide block 2 pushes the inclined guide surface 121 of each lock block 12 for each lock block 12 to be pushed toward the insertion room 11, such that the lock blocks 12 are threadedly connected with the bolt A for the faucet to be installed on the counter top B quickly.

To disassemble the faucet, the nut seat 1 is rotated reversely to move downward relative to the bolt A, such that the counter top B doesn't hold against the slide block 2 and the slide block 2 doesn't push the lock blocks 12. Thus, the nut seat 1 having the slide block 2 is pulled to disengage from the bolt A quickly to achieve a quickly disassembly function.

Similarly, the inclined push surface 25 of the slide block 2 and the inclined guide surface 121 of each lock block 12 of the nut seat 1 constitute a guide device. After the slide block 2 and the nut seat 1 are assembled, the slide block 2 is in contact with the nut seat 1. Before installation, the slide block 2 is in a free state. After installation, the action force contact with the counter top B is applied to the nut seat 1 through the slide block 2, and the guide device makes the lock blocks 12 being deformed inward to engage with the bolt A tightly. When the action force contact with the counter top B is released, the parts restore to the initial state.

The guide device of the present invention is not limited to the inclined push surface and the inclined guide surface. It can be an inclined groove, a slide groove, a guide rail, a guide groove or the like.

To sum up, the nut seat 1 of the present invention has the cantilever lock blocks 12. In normal state, the nut seat 1 can be moved up and down on the bolt A. It is not necessary to rotate the nut seat 1 from the bottom end of the bolt A. When the nut seat 1 is moved to the counter top B to compress the slide block 2, the slide block 2 will push the lock blocks 12 to mesh with the bolt A tightly, so that the faucet can be mounted and dismounted quickly. The assembly and disassembly of the faucet and the related parts is more convenient and quick.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A quick assembly and disassembly mechanism, movably fitted on a bolt at a lower portion of a faucet, comprising a nut seat and a slide block which is movably coupled to the nut seat; the nut seat having an insertion room at a central portion thereof, an upper end of the insertion room being provided with a plurality of spaced cantilever lock blocks which are disposed vertically around the circumference of the insertion room, an inner wall of each lock block having threads thereon, an inner diameter encircled by the lock blocks matching with the bolt at the lower portion of the faucet; an insertion seat formed between the lock blocks and an inner wall of the nut, each lock block having a connecting surface at an upper end thereof, the connecting surface having an insertion hole for the slide block to be inserted into the insertion seat, an outer wall of a lower portion of each lock block being formed with an inclined guide surface which is expanded outwardly from top to bottom; an inner wall of a middle portion of the insertion seat of the nut seat being provided with a plurality of ledges; the slide block being an insertion ring, an annular surface of the slide block being provided with a plurality of claws corresponding in number to the lock blocks, each claw having an engaging hook on an outer wall of a lower end thereof to cooperate with the corresponding ledge, an inner wall of each claw being formed with an inclined push surface which is expanded outward from top to bottom.

2. The quick assembly and disassembly mechanism as claimed in claim 1, wherein an outer wall of the nut seat is formed with spaced vertical pull portions.

\* \* \* \* \*